United States Patent [19]

Klever et al.

[11] Patent Number: 4,558,559
[45] Date of Patent: Dec. 17, 1985

[54] APPARATUS FOR PELLETIZING AND DISTRIBUTING LAWN CLIPPINGS

[75] Inventors: Manfred Klever, Saarbruecken-Scheidterberg; Guenther Schlosser, Saarbruecken-Fechingen, both of Fed. Rep. of Germany

[73] Assignee: Gutbrod Werke GmbH, Saarbruecken-Buebingen, Fed. Rep. of Germany

[21] Appl. No.: 550,107

[22] Filed: Nov. 9, 1983

Related U.S. Application Data

[63] Continuation-in-part of Ser. No. 327,903, Dec. 7, 1981, abandoned.

[30] Foreign Application Priority Data

Dec. 20, 1980 [DE]  Fed. Rep. of Germany ....... 3048364

[51] Int. Cl.[4] ............................................. A01D 84/00
[52] U.S. Cl. ...................................... 56/16.4; 56/16.6; 56/202; 100/210; 100/907
[58] Field of Search .......................... 56/1, 16.4, 16.6; 100/145, 904, 907, 903, 210; 239/668, 672; 56/202

[56] References Cited

U.S. PATENT DOCUMENTS

| | | | |
|---|---|---|---|
| 223,972 | 1/1880 | Ziegler | 100/210 |
| 2,124,744 | 7/1938 | Meakin | 100/210 |
| 2,565,830 | 8/1951 | Weston | 100/905 |
| 3,049,857 | 8/1962 | Shaw | 56/501 |
| 3,125,019 | 3/1964 | Ackerman | 100/210 |
| 3,222,853 | 12/1965 | Michael | 100/145 |
| 3,420,160 | 1/1969 | Mast | 100/210 |
| 3,664,097 | 5/1972 | Pedigo | 56/1 |
| 3,688,479 | 9/1972 | Martinson et al. | 56/13.2 |
| 3,732,674 | 5/1973 | Guillory | 56/13.1 |
| 3,903,565 | 9/1975 | Hicks | 56/202 |
| 4,292,795 | 10/1981 | Linn | 56/14.6 |
| 4,345,416 | 8/1982 | Cameron | 56/202 |
| 4,379,385 | 4/1983 | Reinhall | 56/16.6 |

FOREIGN PATENT DOCUMENTS

| | | |
|---|---|---|
| 311706 | 11/1973 | Austria . |
| 328779 | 4/1976 | Austria . |
| 2054476 | 12/1971 | Fed. Rep. of Germany . |
| 3048364 | 7/1982 | Fed. Rep. of Germany . |

*Primary Examiner*—Gene Mancene
*Assistant Examiner*—David L. Tarnoff
*Attorney, Agent, or Firm*—W. G. Fasse; D. H. Kane, Jr.

[57] ABSTRACT

Lawn clippings are pelletized and distributed back onto the lawn directly, for example, as part of a mowing operation. For this purpose the lawn clippings are supplied into the top of a chamber wherein compression rollers press the clippings through a stationary apertured plate for extruding the clippings in the form of compressed strands. A rotating distribution disk is arranged below the plate for breaking up the strands into pellets and for throwing or distributing the pellets over the lawn as it is being mowed. The pressure applied to the grass clippings is adjusted to be sufficient for the extrusion, but insufficient for squeezing the natural juices out of the grass clippings. To avoid clogging and positive extrusion at all times during the operation, the compression rollers are preferably driven positively by a double drive system for rotation about a vertical and horizontal axis.

14 Claims, 5 Drawing Figures

APPARATUS FOR PELLETIZING AND DISTRIBUTING LAWN CLIPPINGS

CROSS-REFERENCE TO RELATED APPLICATION

The present application is a continuation-in-part application of my copending application U.S. Ser. No. 327,903, filed on Dec. 7, 1981, now abandoned.

FIELD OF THE INVENTION

The present invention relates to an apparatus for pelletizing and distributing lawn clippings. Such an apparatus is used for the care of park areas, especially lawns, whereby the lawn clippings are picked up from the ground, compressed, comminuted and again distributed onto the park or lawn surface. If desired, the comminuted material may also be removed.

It is known to convert lawn clippings into mulch which is directly left on the lawn while mowing the lawn. However, this type of reuse of the lawn clippings has the disadvantage that thatching cannot be avoided.

In connection with haying it is also known to dry the cut green plant material such as grass, alfalfa, and the like by broadly distributing the cut material on the ground and turning the material over repeatedly for a drying by the sun and wind effects. Austrian Pat. Nos. 311,706 and 328,779 depart from this conventional haying procedure by opening up the plant material under pressure to such an extent that moisture is withdrawn sufficiently for a subsequent natural drying on the ground within a relatively short time for instance, within a day. For this purpose these Austrian Patents disclose feeding the cut plants through a worm or screw in a housing, whereby the plants are partially ripped up and torn to shreds. The ripped up and crushed material is then deposited on the ground. If desired, it is possible to simultaneously cut the material as it is being comminuted and crushed. Due to a certain compaction the plants are simultaneously subjected to a juice removal. In any event, the comminuted and crushed material dries on the ground and, if desired, the material may be turned over for improving the quick drying, whereupon the material is collected and removed as hay.

The above described method according to the Austrian references is particularly suitable for producing animal feed in the form of hay. However, this method is not suitable for the removal of grass clippings and grass mulch, especially since thatching could also not be avoided. When the cut and compressed grass is left on the lawn surface where it rests on or between the grass blades, it dries generally so quickly that it cannot rot. As a result, thatching develops, whereby the growing grass is more or less suffocated. This thatching results even where the cut material has been compressed to a certain extent because even the somewhat compressed cut material is subject to a drying operation which prevents its sufficient rotting. Thus, it has been found that a compression by means of a worm or screw is insufficient and it has been found frequently to be unavoidable that the lawn surfaces had to be swept with a lawn sweeper for the removal of the cut material.

U.S. Pat. No. 2,124,744 (Meakin) discloses a pelletizer for feed meal and similar materials. Two freely rotatable compression rollers are mounted with bearings on a horizontal axis which is secured to a vertical driven shaft. The rollers are supposed to press the meal or similar materials in the form of grains through holes in a stationary die plate. The grain is fed laterally into the milling chamber. This type of pelletizer is not suitable for pelletizing grass clippings because the compression rollers repeatedly close the inlet chute and because the freely rotatable compression rollers can slip, whereby their effectiveness for the intended purpose is impaired.

OBJECTS OF THE INVENTION

In view of the above it is the aim of the invention to achieve the following objects singly or in combination:

to treat the cut material in connection with the caring for green park areas, especially lawns, in such a manner that by compressing the cut material the compressed material may remain on the lawn surface to act as a fertilizer;

to provide an apparatus which will compress the cut material to such an extent that it may be pelletized, however, without removing any substantial amount of the natural juices of the cut material such as grass clippings;

to avoid the quick drying of the cut grass clippings so that they may rot to be converted into compost rather than into thatching;

to compress the cut material into strands which may be comminuted into pellets of sufficiently small size so that the pellets will fall into the spaces between the grass blades when the pellets are distributed over the lawn surface, preferably in sequence with a lawn mowing operation;

to drive the cut material through holes in a perforated plate by positively driven rollers which participate in moving the cut material into the holes; and to avoid clogging of the grass clippings in the pelletizer.

SUMMARY OF THE INVENTION

According to the invention the organic material such as grass clippings, is fed under compression through an apertured plate for forming strands of compressed organic material. The strands are then chopped up as they emerge from the apertured device, whereby the strands are pelletized and the resulting pellets are distributed preferably by the chopping action.

The apparatus according to the invention comprises strand forming means which constitute an apertured bottom wall of a housing in which compression rollers are arranged for cooperation with the strand forming apertured bottom wall. The compression rollers are rotated by drive means in the housing to press the organic material through the strand forming apertured bottom wall to form strands emerging out of the housing. Chopping-up means are operatively arranged for the cooperation with the strand forming means. The chopping-up means are driven to pelletize the strands and thereby distributing the resulting pellets outside of the housing onto a surface to be fertilized.

By compressing the grass clippings under relatively high pressure by means of the compression rollers which are preferably positively driven twice, the apparatus of the invention makes pellets in which the natural juices of the grass are substantially retained. The double driving of the compression rollers avoids clogging. The retained moisture content assures the proper rotting of the pellets which thus satisfy to a high degree the requirements for a proper nourishing of a lawn while simultaneously avoiding thatching. These pellets are small enough so as to fall into the spaces between the growing grass blades, whereby removal of the grass clippings is obviated. By avoiding a rapid drying due to the moisture retaining, a desired aerobic decomposition of the pellets is assured. Due to the compression the pellets have a relatively high density so that the above mentioned falling of the pellets into the spaces between the grass blades is substantially facilitated, whereby the pellets come into contact with the ground which in turn aids the aerobic decomposition process. The aerobic decomposition takes place in the pellets from the inside outwardly so that the pellets do not disturb the natural growing of the grass blades remaining standing after the mowing. The pellets actually function substantially as a natural fertilizer due to the progressing aerobic decomposition process, whereby a vigorous growth of the grass is enhanced. This function of the present pellets takes place when the weather is relatively dry as well as when it is relatively moist.

The retaining of the moisture content facilitates the strand formation and also helps the pellet formation which retain their shape until the aerobic decomposition is substantially completed.

The double drive of the compression rollers involves a positive drive about a vertical drive shaft and a second positive drive about the horizontal rotational axis of each compression roller also derived from the same drive shaft, whereby clogging is substantially avoided.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
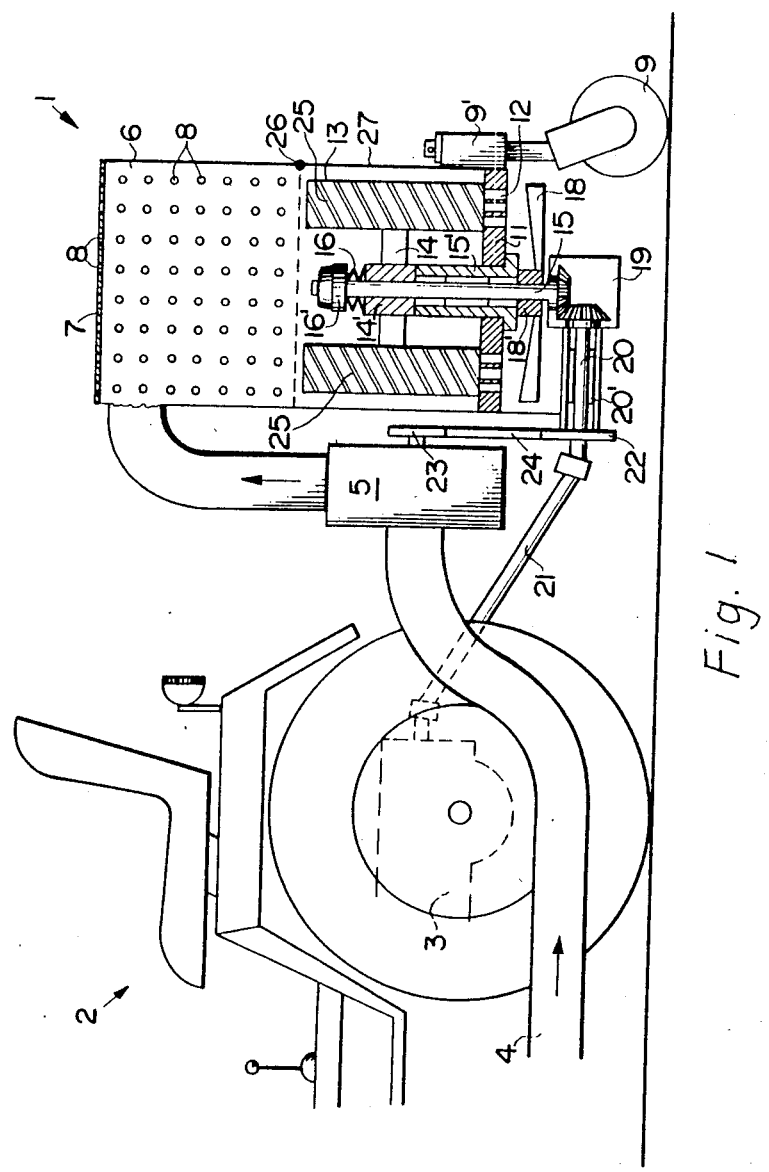
FIG. 1 shows a side view of the present apparatus partially in section and connected to the rear end of a lawn care tractor or lawn mower.
Figure 3:
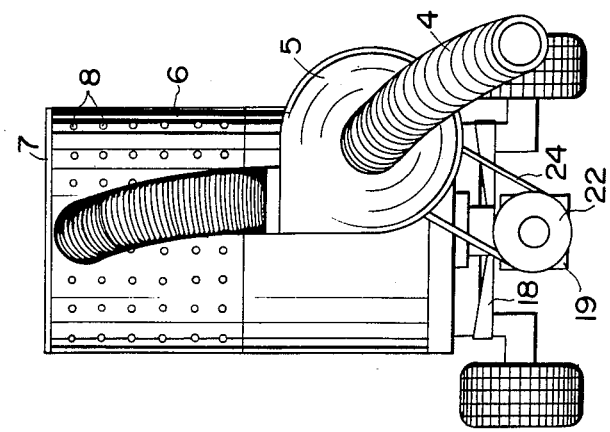
FIG. 3 is an elevational view of the pelletizing portion of the present apparatus as viewed in the rearward direction from the tractor.
Figure 2:
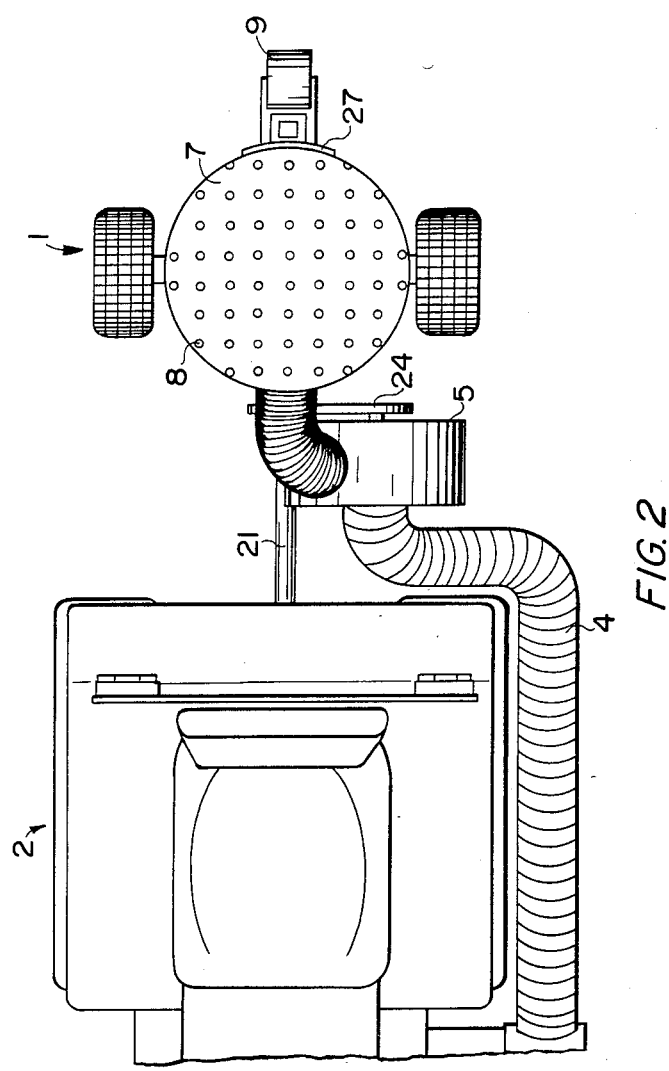
FIG. 2 is a top plan view of the apparatus of FIG. 1.

Referring to FIGS. 1, 2 and 3, the present apparatus 1 is preferably adapted for connection to a source of power such as a lawn mower 2 equipped with a power take-off 3 and carrying the mower proper on a so-called underbelly mount not shown. The grass clippings are conveyed through a conduit 4 by means of a suction fan 5 producing a conveying air stream for moving the grass clippings into the top portion of a housing or collecting chamber 6 provided with a cover 7 and venting holes 8. The apparatus 1 may be connected to the tractor 2 by a standard three point hitch not shown. If desired, the frame 9' of the apparatus 1 may also be supported by one or several running rollers 9.

The housing 6 extends with its longitudinal axis substantially vertically and is equipped with an access door 27 hinged to the housing by hinging means 26. The door 27 is located in a zone to provide easy access to the internal structure of the apparatus 1 which will be described in more detail below. The bottom of the housing 6 comprises strand forming means in the form of a plate 11 having apertures 12 therein. The plate 11 forms the bottom wall of the housing 6. The apertures 12 function as extruder channels for the grass clippings to form strands of compressed grass clippings.

By feeding the clippings into the top of the housing the clippings fall down by gravity onto compression roller 13 which thus cannot interfere with the proper feeding of the clippings by obstructing the inlet. As the clippings fall onto the rollers the effectiveness of the rollers is enhanced because the rollers can thus transport the clippings to the apertures 12 in the bottom wall 11. The grass clippings are forced through the strand forming apertures or channels 12 by means of compression rollers 13 which may have a smooth surface or preferably a grooved surface with slanted grooves 25 for facilitating the pressing of the grass into the apertures or channels 12 and for helping in the just mentioned transporting of clippings downwardly toward the apertures 12.

In FIG. 1 the compression rollers 13 are rotatably secured to a cross-shaft 14 which in turn is connected through a slide bearing 14' to a vertical drive shaft 15, for example by means of a tongue and groove connection not shown. The upper end of the drive shaft 15 has a threading to which there is secured an adjustment nut 16' bearing against a spring 16 such as a cup or Belleville spring which in turn bears against the slide bearing 14' to thereby press the rollers 13 with an adjustable force against the apertured plate 11. For this purpose there is sufficient play between the slide bearing 14' and the further bearing bushing 15' through which the drive shaft 15 extends to allow the adjustment of the nut 16' and thus of the spring 16.

The drive shaft 15 thus drives in FIG. 1 the freely rotatable rollers 13 on the cross-shaft 14 in a rotational movement, whereby the circumferential surfaces of the compression rollers 13 with the slanted grooves 25 press against the plate 11 in the region of the extrusion apertures or channels 12.

The extrusion channels 12 have preferably a diameter within the range of 5 to 15 mm and a length of 5 to 20 mm depending on the thickness of the apertured plate 11.

Below the plate 11 there is arranged a chopping-up means 18 in the form of a rotating disk or blade. The chopping-up means 18 may also have the form of a propeller having several blades. Preferably the chopping-up means 18 are also driven from the same source of power. For this purpose a hub 18' connects the chopping blade 18 to the drive shaft 15.

The drive shaft 15 in turn is driven through a gear means 19 connected to the power take-off 3 of the tractor 2 through a universal link 21 and a further drive shaft 20 supported by bearing means 20' conventionally connected to the frame or body of the apparatus 1. However, if desired, the shaft 20 may be connected to the output or power take-off of an independent prime mover. As shown, the shaft 20 carries a pulley 22 for driving a belt 24, for example a V-belt running over a further pulley 23 for driving the conveying exhaust fan 5. Thus, the power output 3 of the tractor drives the fan 5, the compression roller 13, and the chopping-up propeller 18. The illustrated structure is very simple and thus rugged for the intended purposes of treating large lawn surfaces.

As shown the propeller will directly spread the pellets as the mowed grass clippings are supplied into the housing 6 so that the mowing, the gathering of the clippings and their conversion into pellets, as well as the distribution of the pellets takes place in a single operation. However, it is also possible to collect the material with the aid of the suction conduit 4 after a previous mowing operation by another machine.

The drive shaft 15 is preferably arranged centrally in the bottom of the plate 11, and the plate 11 as well as the housing are preferably circular to avoid dead spaces.

By adjusting the nut 16' it is possible to determine the pressure of the compression rollers 13 so that the pressure is sufficient to form the strands but insufficient to remove any substantial quantities of the natural juices from the organic material, whereby these juices are substantially retained in the formed pellets. A suitable diameter for the holes 12 has been found to be 8 mm. By properly arranging the chopping-up propeller 18 relative to the strand forming plate 11 and by driving the propeller at the proper speed, it is assured that the resulting pellets have the desired relatively short length. The propeller also assures that the pellets are distributed over a relatively wide circular swath. By arranging the gear means 19 directly under the propeller 18 a compact structure is achieved.

FIGS. 2 and 3 show a top plan view and a view of the pelletizer as seen by looking rearwardly from the driver seat.

Figure 4:
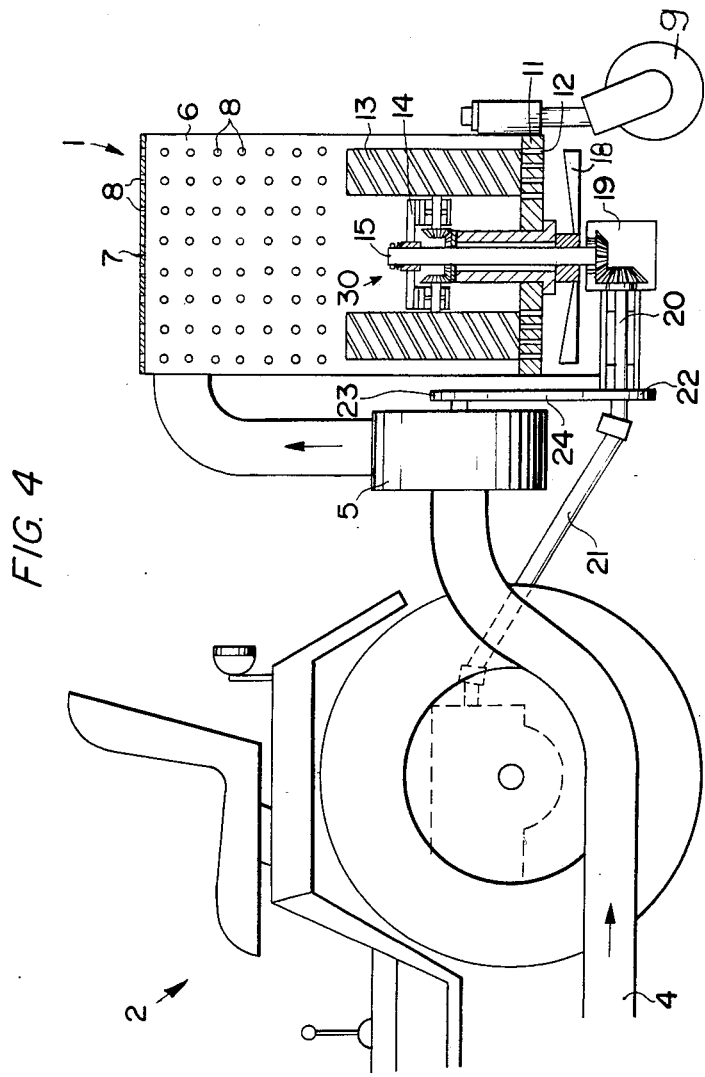
FIG. 4 is a view similar to that of FIG. 1, but showing a modified embodiment in which the compression rollers are connected to two positive drives.
Figure 5:
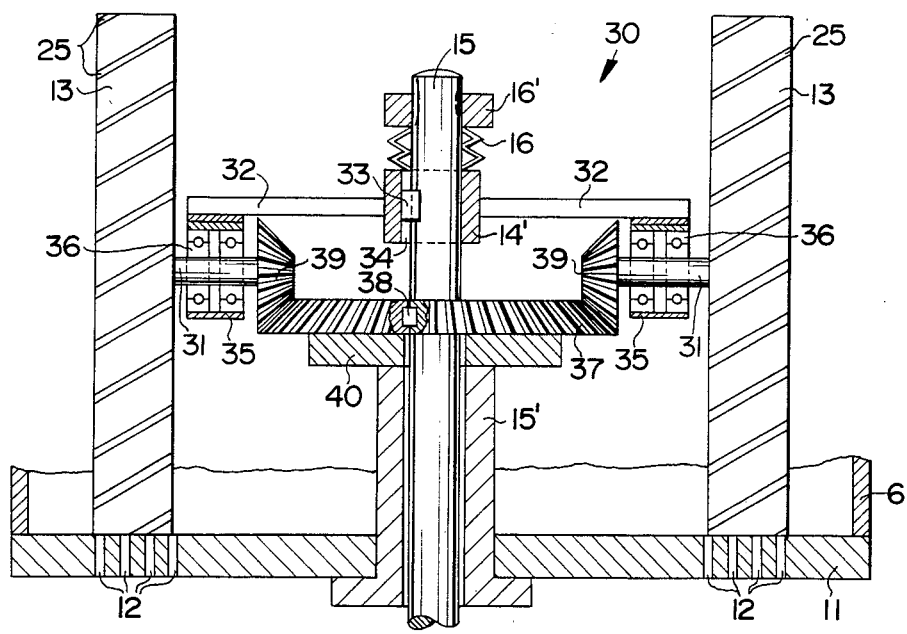
FIG. 5 is an enlarged view of the two positive drives.

FIGS. 4 and 5 show a modified embodiment of the invention. The same reference numbers designate the same components in all figures. Therefore, only the modification 30 will be described. The modification 30 is a double drive system for the compression rollers 13 as generally shown in FIG. 4, and as shown in more detail in FIG. 5.

The double drive system 30 for the compression rollers 13 is shown in an enlarged scale in FIG. 5 as compared to FIG. 4. The power input for the double drive system 30 is derived from the vertical drive shaft 15 which is the same as the drive shaft 15 in FIG. 1. This double drive system drives the rollers positively in two ways. The first positive drive takes place due to the rotation of the driven shaft 15 about its vertical axis. The second positive drive is also derived from the rotation of the shaft 15 and causes a rotation of the compression rollers 13 about a horizontal axis defined by the drive shafts 31 of the rollers 13.

The first positive drive is transmitted to the rollers 13 through spoke type arms 32 secured on the one hand to the drive shaft 15 by a hub type bearing 14', for example, by a key 33 sliding in a groove 34 of the hub 14', thus imparting torque to the arms 32 and permitting a limited axial movement relative to the shaft 15 under the pressure of the spring 16 as adjusted by the adjustment nut 16'. Each radially outer end of the arms 32 is effective on the shafts 31 through a bearing housing 35. The shafts 31 are supported by bearings 36 in the bearing housings 35.

The second positive drive is derived from the shaft 15 by a bevel gear 37 which derives torque from the shaft 15, but is slightly movable axially relative to the shaft 15 by reason of a key 38. The bevel gear 37 cooperates or drives two further bevel gears 39 rigidly secured to the shafts 31 for rotating the compression rollers 13 about their own rotational axes extending horizontally. The bevel gear 37 rests on a bearing plate 40 which may be a slide bearing or an anti-friction bearing. The bearing plate 40 in turn rests on the bearing bushing 15' which in turn is secured to the bottom wall 11 of the housing 6.

By positively driving the compression rollers 13 in two ways as just described, the advantage is achieved that clogging is substantially avoided. Further, by feeding the grass clippings into the top of the housing 6, the compression rollers 13 cannot obstruct the input of grass clippings. Rather, with their grooves 25 the compression rollers are enabled to transport any grass clippings that fall onto the rollers 13 to the discharge channels or apertures 12 for forming the strands to be pelletized as described above.

Although the invention has been described with reference to specific example embodiments, it will be appreciated, that it is intended to cover all modifications and equivalents within the scope of the appended claims.

What is claimed is:

1. An apparatus for pelletizing and distributing an organic grass type material, comprising tractor means (3) having a power take-off shaft (21), a housing operatively connected to said tractor means for moving said housing by said tractor means, air flow conveying means for feeding the organic material into said housing at an upper unobstructed portion of said housing, vent holes (8) in said upper housing portion located so that said organic material falls down by gravity while air of said air flow can escape through said vent holes, strand forming means arranged in said housing as a substantially horizontal bottom wall (11) of said housing, said bottom wall (11) having extrusion holes (12) therein, compression means operatively arranged in said housing for cooperation with said strand forming means, said compression means comprising a plurality of compression rollers (13), each compression roller having a substantially horizontally extending rotational axis (31), said rollers (13) having surfaces riding over said extrusion holes (12) in said bottom wall, said roller surfaces being fully exposed to organic material falling down by gravity substantially throughout the entire upper unobstructed housing portion for pressing said organic material through said extrusion holes, drive means operatively connecting said compression rollers to said power take-off shaft, said drive means comprising a rotating central driven shaft (15), first means (32) drivingly connecting said central driven shaft to said rotational axes (31) for moving said rotational axes (31) in a plane extending substantially perpendicularly to said driven shaft (15), and second means (37, 39) rotatingly connecting said rotational axis (31) also to said driven shaft (15) for also positively rotating said compression rollers (13) about said rotational axes (31) in said housing to press the organic material through said extrusion holes for forming strands of organic material emerging downwardly out of said housing, chopping-up means operatively arranged below said bottom wall for cooperation with said strand forming means in chopping-up strands as they emerge from said extrusion holes, and third means (18') connecting said chopping-up means to said driven shaft (15) for rotating the chopping-up means also from said power take-off shaft to pelletize the strands and distributing the resulting pellets outside said housing onto a surface to be fertilized as said tractor means move said housing over said surface.

2. The apparatus of claim 1, wherein said chopping-up means comprise a rotatable propeller (18) operatively supported below said bottom wall.

3. The apparatus of claim 1, wherein said driven shaft extends vertically and centrally through said strand forming means and wherein said first connecting means comprise a cross-bar operatively connecting said driven shaft to said compression means, whereby the compression means travel on said strand forming means, said apparatus further comprising a centrally arranged single spring means arranged for urging said compression rollers against said strand forming means.

4. The apparatus of claim 3, wherein said single spring means for urging said compression rollers comprise a Belleville spring operatively interposed between said driven shaft and said cross-shaft for pressing the compression means against said strand forming means, and adjustment means arranged for adjusting the effectiveness of said Belleville spring means and thus the force which presses the compression rollers against the strand forming means.

5. The apparatus of claim 1, wherein said holes in said strand forming bottom plate have a diameter within a range of about 5 to 15 mm, and a length within a range of about 5 to 20 mm.

6. The apparatus of claim 1, wherein said third connecting means comprise means for rigidly connecting said rotatable chopping-up disk to said first mentioned drive means in a torque transmitting manner.

7. The apparatus of claim 2, wherein said drive means comprise, in addition to said driven shaft, gear means arranged centrally below said propeller (18) in an enclosed box (19) for connecting said driven shaft to said power take-off shaft (21), wherein said air flow conveying means comprise a fan, and further drive means (23, 24) operatively connected outside said housing between said conveying fan and said power take-off shaft for supplying drive power to said conveying fan, whereby said conveying fan (5), said compression rollers (13) and said chopping-up means are all driven by said power take-off shaft of said tractor means.

8. The apparatus of claim 1, wherein said housing comprises closable door means for cleaning and maintenance purposes, said door means being located in the zone of said compression means.

9. The apparatus of claim 1, wherein said compression rollers (13) have slanted grooves (25) in their circumferential surface for improved driving of the organic material through said extrusion holes.

10. An apparatus for extruding an organic grass type material, comprising a source of power having a power take-off shaft (21), a housing, air flow inlet means in said housing for feeding the organic material into said housing at an upper unobstructed portion of said housing, vent holes (8) in said upper housing portion located so that said organic material falls down by gravity while air of said air flow can escape through said vent holes, strand forming means arranged in said housing as a substantially horizontal bottom wall (11) of said housing, said bottom wall (11) having extrusion holes (12) therein, compression means operatively arranged in said housing for cooperation with said strand forming means, said compression means comprising a plurality of compression rollers (13) arranged for rotation about a horizontal roller axis (31), said compression rollers (13) having surfaces riding over said extrusion holes (12) in said bottom wall, said roller surfaces being arranged below said inlet means to be fully exposed to organic material falling down by gravity substantially throughout the entire upper unobstructed housing portion for pressing said organic material through said extrusion holes, first power transmission drive means (15, 37, 39) operatively connecting said compression rollers to said power take-off shaft for positively rotating each of said compression rollers (13) in said housing about its respective horizontal roller axis (31) to press the organic material through said extrusion holes for forming strands of organic material emerging downwardly out of said housing, and second power transmission drive means (15, 32, 33) operatively connecting said same power take-off shaft to said compression rollers (13) for positively driving said compression rollers about a vertical axis (15), whereby said compression rollers (13) are positively driven simultaneously about said vertical axis (15) and about the respective horizontal axis (31).

11. The apparatus of claim 10, wherein said first power transmission drive means comprise a vertical drive shaft (15) and torque transmitting means (37, 39) operatively connected between said horizontal roller axes (31) of said compression rollers and said vertical drive shaft for rotating each compression roller individually about its respective horizontal roller axis (31), and wherein said second power transmission drive means comprise a horizontal crossbar (32) operatively interconnecting said vertical drive shaft (15) and said compression rollers (13) for also simultaneously positively moving said compression rollers about said vertical axis.

12. The apparatus of claim 11, wherein said second power transmission drive means comprise bearing housing means and bearings in said bearing housing means, said horizontal roller axes (31) of said compression rollers being hel by said bearings in said bearing housing means, said horizontal crossbar (32) connecting said vertical drive shaft (15) to said bearing housing means for transmitting torque to said bearing housing means, and wherein said first power transmission drive means comprise bevel gear means including a bevel gear (39) on each roller axis (31) and a further bevel gear (37) on said vertical shaft (15) meshing with the bevel gears on the roller axes.

13. The apparatus of claim 10, further comprising strand chopping-up means operatively arranged below said bottom wall for cooperation with said strand forming means in chopping-up strands as they emerge from said extrusion holes, and means (18') connecting said chopping-up means to said drive means (15) for rotating the chopping-up means also from said power take-off shaft to pelletize the strands and distributing the resulting pellets outside said housing onto a surface to be fertilized as said tractor means move said housing over said surface.

14. The apparatus of claim 13, wherein said chopping-up means comprise a rotatable propeller (18) operatively supported below said bottom wall.

* * * * *